Oct. 15, 1935.　　　　C. B. JAHNKE　　　　2,017,756
OIL FILTER BASE
Filed March 12, 1934　　　2 Sheets-Sheet 1

Inventor
Charles B. Jahnke
By V. F. Sussage
Atty.

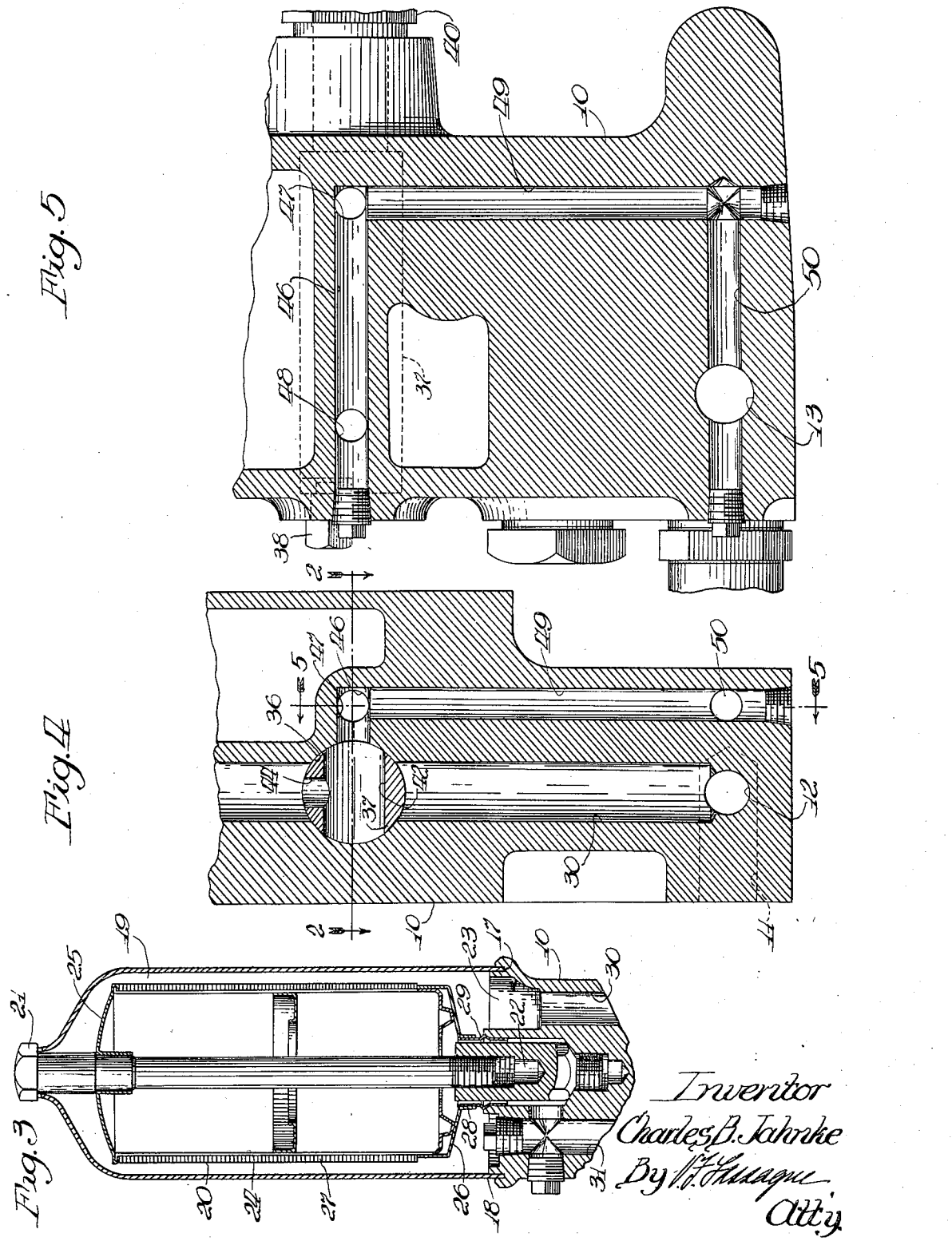

Patented Oct. 15, 1935

2,017,756

UNITED STATES PATENT OFFICE 2,017,756

OIL FILTER BASE

Charles B. Jahnke, Oak Park, Ill., assignor to International Harvester Company, a corporation of New Jersey Application March 12, 1934, Serial No. 715,051

4 Claims. (Cl. 210—165)

This invention relates to an oil filter particularly adapted for internal combustion engines. More particularly it relates to a means incorporated in the filter for draining and cleaning the filter with the minimum loss of oil and without stopping oil circulation through the line in which the filter is positioned.

The principal object of the invention is to provide in the base of an oil filter a valve means operable to shut off the portion of the filter containing the filtering element and at the same time to connect the filtering element compartment to a draining passage.

Another object is to incorporate means in a filter for by-passing all of the oil normally delivered thereto during cleaning of the filter element, whereby it is unnecessary to stop operation of the engine.

These objects and other more specific objects relating to the particular valve construction as incorporated in a filter base are accomplished by a construction such as shown in the attached drawings, in which:

Figure 3 is a vertical section on a reduced scale showing a portion of the base, the filtering element, and a container forming the compartment in which it is located;

Figure 4 is a section taken on the line 4—4 of Figure 1; and,

Figure 5 is a section taken on the line 5—5 of Figure 4.

Figure 1:
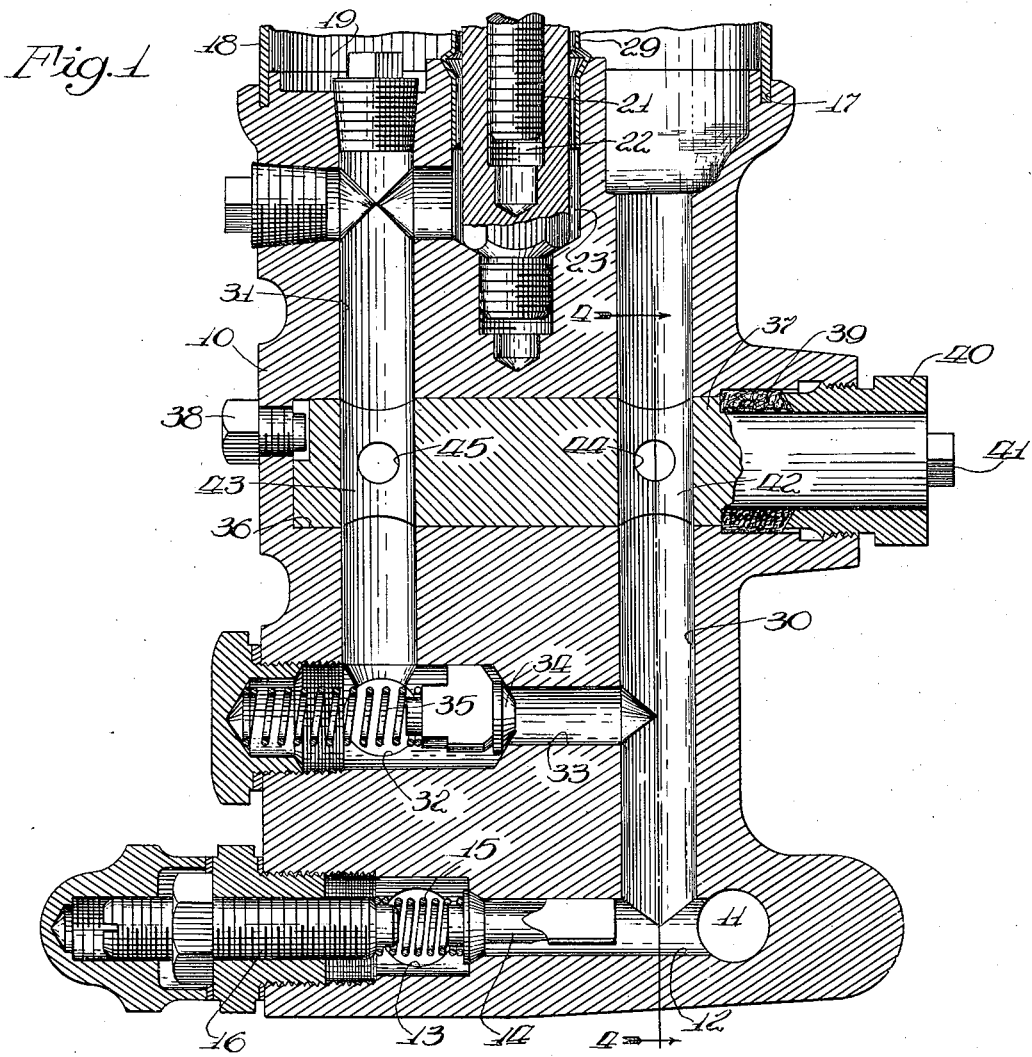
Figure 1 is a vertical section taken through a filter base in a plane to show most of the conduits contained therein and the valve for draining the filter compartment, the top of the filter being broken off above the base.

Oil filters very similar to the type illustrated above have been in wide use on internal combustion engines for many years. These filters have usually been constructed with a cast base which is cored or bored out to form the various conduits for oil. In the following description these conduits will be referred to as positive elements, as they could be so formed from independent pipes. The claims are also drawn to recite the conduits as positive elements.

In the conventional oil filter of the type illustrated the base 10 is adapted to be secured to the crank case of an engine or in any other suitable position. Oil under pressure from a pump driven by the engine is forced into a conduit 11 in the base 10. A conduit 12 connects the conduit 11 with a conduit 13, which leads back into the oil reservoir. A pressure regulating valve 14 is positioned in the conduit 12 and held resiliently in seated position by a spring 15. By means of a threaded element 16 accessible from the outside of the casing pressure on the spring 15 may be varied, thereby regulating the pressure required to open the valve 14 and by-pass the oil back to the reservoir.

At the top of the casing 10, an annular recess 17 is formed in which a cylindrical container 18 is seated. Said container forms the filter compartment 19 in which the filtering element 20 is located. A bolt 21 extends through an opening formed in the top of the container 18 and is threaded into a bore 22 formed in the base concentric with the recess 17. Means are provided for forming an oil tight seal of the container 18 with the recess 17 and with the head of the bolt 21. An annular channel 23 is formed in the base concentric with the recess 17 and spaced from the bore 22.

The filtering element 20 is of the metallic type consisting of a frame structure 24 having a cover 25, a bottom 26, and filtering material 27. As illustrated, said material consists of spaced metallic ribbon, although it may be formed of screen, or, in so far as the present invention is concerned, it may be of felt fabric or other filtering material. The bottom 26 of the filtering element is provided with a neck portion 28 which is fitted to a sleeve 29. Said sleeve is fitted into the annular space 23, being formed with an enlarged rib to form a seat against the portion of the base surrounding the space 23. The sleeve 29 is spaced from the base portion which it surrounds to form an outlet channel from the interior of the filtering element communicating with the space 23. The bolt 21 is formed with a shoulder which engages the top portion 25 of the filtering element holding it securely in position.

A conduit 30 communicates with the conduit 12 and the conduit 11 and extends vertically into communication with the compartment 19 which contains the filtering element. A conduit 31 parallel to the conduit 20 communicates with the space 23 and with an outlet conduit 32 leading to the bearings of the engine or to other locations where filtered oil is to be collected or utilized. A conduit 33 joins the conduits 30 and 31. A valve 34 positioned in said conduit is seated to open by a pressure in the supply conduit determined by pressure of the reacting spring 35 seated against the valve 34.

The construction as above described is conventional and has been illustrated and described only to show the embodiment of my invention and a particular filter construction in which it is particularly adaptable for use.

A horizontal bore 36 is formed in the base 10 intersecting the conduits 30 and 31. Said bore is open at one end through which a cylindrical valve member 37 projects. At the dead end of the bore 36 a stud 38 is provided to engage a recess formed in the end of the valve member for limiting the rotation of said member to 90 degrees. Suitable packing 39 around the projecting end of the valve member 37 and a packing nut 40 are provided for securing the valve member in position in an oil tight manner. A stud 41 on the projecting end of valve member 37 provided means for turning the valve member as desired.

Figure 2:
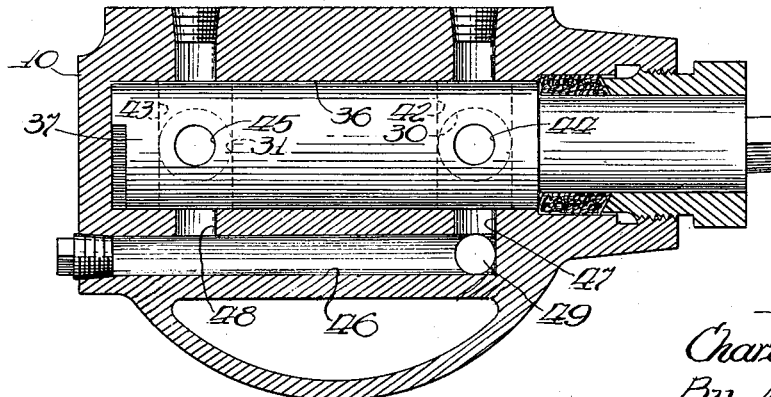
Figure 2 is a section taken on the line 2—2 of Figure 4.

A bore 42 is formed in the valve member 37 to align in one angular position of said member with the conduit 30. A bore 43 is also formed in said member to align in one angular position with the member 31. The bores 42 and 43 are parallel, whereby communication through the conduits 30 and 31 is formed in the same angular position of the valve member. At right angles to the bores 42 and 43 bores 44 and 45 are formed in the valve member extending from the bores to one side only of the valve member. This construction is best shown in Figure 4. A conduit 46 parallel to the valve member 37 extends alongside thereof in communication with the bores of the valve member by a short conduit 47 positioned to align with the bore 44 in one angular position of the valve member and a short conduit 48 positioned to align with the bore 45 in the same angular position of the valve member. This alignment occurs when the valve member is turned 90 degrees from the position shown in Figure 2. A conduit 49 communicates with the conduit 46 and with a horizontal conduit 50 leading to the conduit 13, which communicates with the oil reservoir or with the inlet side of the filtering system.

In the operation of a filter as above described, when the valve member 36 is in the position shown in Figure 1, oil from the pump or any other source of pressure is delivered through the conduits 11 and 30 into the filter compartment 19. Passing through the filtering material 27 the oil passes out through the annular space 23 into the conduit 31 and therefrom through the outlet conduit 32. In case of excess resistance in the filtering element due to the accumulation of foreign particles on the filtering material, the oil is by-passed through the conduit 33 and past the relief valve 34 into the discharge conduit 32. In order to prevent excess oil pressure in the bearings the regulating valve 14 is provided, whereby at high engine speeds, or for any other reason, when the oil pressure becomes excessive, oil is by-passed through the conduit 12 and the valve 13 into the conduit 13 which leads back to the oil reservoir.

Often times it is found desirable to clean the filtering element without stopping the engine. This is particularly true for certain operations and for certain types of engines such as those of the Diesel type in which starting is difficult. By rotating the valve member 37 ninety degrees into the position shown in Figure 4, the conduits 30 and 31 are cut off from communication with the filtering compartment. The lubricating oil is then by-passed through the conduit 33 and supplied to the bearings without being filtered. It is, therefore, not necessary to interfere with the engine operation during cleaning of the filter.

For cleaning the filtering element, it is desirable, of course, to waste as little oil as possible. By placing the conduits 47 and 48 in the position illustrated, said conduits communicate with the bores 42 and 43 when the valve member 37 is turned into cut off position. By forming the additional bores 44 and 45 in the valve member, communication is established by the filtering compartment, both inside and outside the filtering material, with the drain conduits 46, 49, and 13. By this means oil is drained back to the reservoir and is not wasted or spilled in undesirable locations. The bolt 21 may be loosened to provide air and break the possible vacuum to facilitate rapid draining of the oil from the filtering compartment. As soon as the filtering element has been cleaned it is replaced and the valve member 37 is turned back into position opening the supplying conduit 30 and the drain conduit 31.

It is to be understood that applicant has shown an embodiment of his invention in a conventional type of oil filter, however, he contemplates all modifications in any type of filter to which the invention is applicable and claims these modifications as a part of his invention.

What is claimed is:

1. An oil filter comprising a filtering element, a conduit for supplying oil to be filtered to one side of said element, a conduit for removing filtered oil from the other side of the element, a by-pass conduit connecting said conduits, a relief valve in said conduit positioned to be opened by a predetermined pressure in the oil supplying conduit for by-passing oil around the filtering element, a drain conduit, and a single valve means operable to close both the oil supplying and removing conduits and to connect said conduits between the valve member and the filtering element with the drain conduit.

2. An oil filter comprising a base portion, a casing mounted above said base portion, a filtering element mounted in said casing, a conduit leading from a source of oil under pressure to one side of the filtering element, a conduit for filtered oil leading from the other side of the filtering element, a by-pass conduit between the supply and discharge conduit adapted to by-pass oil upon a predetermined pressure in the supply conduit, a rotary valve member intercepting the supply and discharge conduits between the filtering element and the by-pass conduit, said valve member being formed to permit free passage of oil through said conduits in one position and being formed to stop the flow of oil through both conduits in another position, and a drain conduit communicating with the supply and discharge conduits adjacent the valve member, said valve member being formed with passages to provide communication between the container and the drain passage when the valve member is in a position to cut off flow through the supply and discharge conduits.

3. An oil filter comprising a filtering element, a conduit for supplying oil to be filtered to one side of said element, a conduit for removing filtered oil from the other side of the element, a by-pass conduit connecting said conduits, a drain conduit, and a single valve means operable to close both the oil supplying and removing conduits and to connect said conduits between the valve member and the filtering element with the drain conduit.

4. An oil filter comprising a base portion, a casing mounted above said base portion, a filtering element mounted in said casing, a conduit leading from a source of oil under pressure to one side of the filtering element, a conduit for filtered oil leading from the other side of the filtering element, a by-pass conduit between the supply and discharge conduit, a rotary valve member intercepting the supply and discharge conduits between the filtering element and the by-pass conduit, said valve member being formed to permit free passage of oil through said conduits in one position and being formed to stop the flow of oil through both conduits in another position, and a drain conduit communicating with the supply and discharge conduits adjacent the valve member, said valve member being formed with passages to provide communication between the container and the drain passage when the valve member is in a position to cut off flow through the supply and discharge conduits.

CHARLES B. JAHNKE.